(12) United States Patent
Nishida

(10) Patent No.: US 11,906,612 B2
(45) Date of Patent: Feb. 20, 2024

(54) OBJECT DETECTION DEVICE AND OBJECT DETECTION METHOD

(71) Applicant: Mitsubishi Electric Corporation, Tokyo (JP)

(72) Inventor: Takaaki Nishida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 766 days.

(21) Appl. No.: 16/982,680

(22) PCT Filed: May 14, 2018

(86) PCT No.: PCT/JP2018/018540
§ 371 (c)(1),
(2) Date: Sep. 21, 2020

(87) PCT Pub. No.: WO2019/220503
PCT Pub. Date: Nov. 21, 2019

(65) Prior Publication Data
US 2021/0003687 A1    Jan. 7, 2021

(51) Int. Cl.
*G01S 13/06*    (2006.01)
*G01S 13/58*    (2006.01)
*G01S 13/931*    (2020.01)

(52) U.S. Cl.
CPC .............. *G01S 13/06* (2013.01); *G01S 13/58* (2013.01); *G01S 13/931* (2013.01)

(58) Field of Classification Search
CPC .......... G01S 13/06; G01S 13/42; G01S 13/58; G01S 13/726; G01S 13/878; G01S 13/931
See application file for complete search history.

(56) References Cited

U.S. PATENT DOCUMENTS

2011/0102242 A1    5/2011    Takeya et al.
2013/0335259 A1*   12/2013   Yasugi .................. G06V 10/811
                                                                             342/52

(Continued)

FOREIGN PATENT DOCUMENTS

JP       2002-341014 A    11/2002
JP       2008-286582 A    11/2008

(Continued)

OTHER PUBLICATIONS

International Search Report of PCT/JP2018/018540 dated Jul. 24, 2018 [PCT/ISA/210].

*Primary Examiner* — Timothy A Brainard
(74) *Attorney, Agent, or Firm* — Sughrue Mion, PLLC; Richard C. Turner

(57) ABSTRACT

An object detection device includes: a measurement unit configured to transmit a radio wave to measure, based on a reflected wave acquired from an object to be detected existing in a periphery of the moving body, a position and a doppler speed of the object as a reflection point; a grouping processing unit configured to execute grouping processing when a plurality of reflection points are acquired, and are determined to be acquired from the same object; a moving speed calculation unit configured to use the doppler speeds and the positions of the plurality of reflection points acquired from the same object, to thereby calculate a moving direction and a moving speed of the same object; and an output unit configured to output the calculated moving direction and moving speed as information on a position and a speed corresponding to detection results of the same object.

6 Claims, 9 Drawing Sheets

(56) References Cited

U.S. PATENT DOCUMENTS

| | | | |
|---|---|---|---|
| 2017/0097412 A1* | 4/2017 | Liu | G01S 7/415 |
| 2017/0356991 A1* | 12/2017 | Yosoku | G01S 13/60 |
| 2018/0356505 A1* | 12/2018 | Miyata | G01S 13/878 |

FOREIGN PATENT DOCUMENTS

| | | |
|---|---|---|
| JP | 2011-158292 A | 8/2011 |
| JP | 4994412 B2 | 8/2012 |

* cited by examiner

OBJECT DETECTION DEVICE AND OBJECT DETECTION METHOD

CROSS REFERENCE TO RELATED APPLICATIONS

This application is a National Stage of International Application No. PCT/JP2018/018540, filed May 14, 2018.

TECHNICAL FIELD

The present invention relates to an object detection device and an object detection method, which are configured to detect a position and a speed of an object to be detected.

BACKGROUND ART

Hitherto, as an object detection device of this type, there has been known a radar device configured to transmit a radio wave from a radar to an object, to thereby measure a distance, an angle, and a relative speed with respect to the object (for example, see Patent Literature 1). In this case, the measured distance and angle contribute to detection of the position of the object.

This radar device is mounted to an own vehicle which is a moving body, and includes object moving direction determination means and object speed calculation means as characteristic configurations. The object moving direction determination means is configured to determine a moving direction of the object when a normal direction to a directly opposed direction of the radar is defined as X. Incidentally, a directly opposed direction of the normal direction X of the radar is Y. The object speed calculation means is configured to calculate a speed of the object based on the determination result of the object moving direction determination means.

Specifically, when the object moving direction determination means determines that the object is moving in the direction X, the object speed calculation means calculates the speed of the object in the normal direction X as $(V-Vs*\cos \theta)/\sin \theta$. The symbol $\theta$ in this expression represents an angle of the object with respect to the directly opposed direction Y of the radar device. V represents the relative speed measured by the radar. Vs represents a speed of the own vehicle. The symbol "*" represents an operator of multiplication.

CITATION LIST

Patent Literature

[PTL 1] JP 4994412 B2

SUMMARY OF INVENTION

Technical Problem

When the above-mentioned radar device described in Patent Literature 1 is used to calculate the speed of the object, the object moving direction determination means first determines the moving direction of the object in a first cycle. After that, the object speed calculation means calculates the speed of the object in a second cycle. Therefore, a period of time of at least two cycles is required in order to obtain the moving direction and the moving speed of the object. As a result, the radar device described in Patent Literature 1 has a problem in that a substantially long period of time is required in order to detect the speed of the object.

The present invention has been made to solve the above-mentioned problem, and therefore has an object to provide an object detection device and an object detection method, which are capable of calculating a moving direction and a moving speed of the same object in a short period of time compared with a related art.

Solution to Problem

In order to achieve the above-mentioned object, according to one embodiment of the present invention, there is provided an object detection device which is mounted to a moving body, the object detection device including: a measurement unit configured to transmit a radio wave to measure, based on a reflected wave acquired from an object to be detected existing in a periphery of the moving body, a position and a doppler speed of the object at a reflection point; a grouping processing unit configured to execute, when a plurality of reflection points are acquired as the reflection points, grouping processing of determining whether the plurality of reflection points are acquired from the same object, and forming groups each including reflection points determined to be acquired from the same object; a moving speed calculation unit configured to use the doppler speeds and the positions of the plurality of reflection points of the same object based on a result of the grouping processing, to thereby calculate a moving direction and a moving speed of the same object; and an output unit configured to output the moving direction and the moving speed calculated by the moving speed calculation unit as information on a position and a speed of the same object.

In order to achieve the above-mentioned object, according to one embodiment of the present invention, there is provided an object detection method which is applied to a moving body, the object detection method including: a first step of transmitting a radio wave to measure, based on a reflected wave acquired from an object to be detected existing in a periphery of the moving body, a position and a doppler speed of the object at a reflection point; a second step of executing, when a plurality of reflection points are acquired as the reflection points in the first step, grouping processing of determining whether the plurality of reflection points are acquired from the same object, and forming groups each including reflection points determined to be acquired from the same object; a third step of using the doppler speeds and the positions of the plurality of reflection points of the same object based on a result of the grouping processing executed in the second step, to thereby calculate a moving direction and a moving speed of the same object; and a fourth step of outputting the moving direction and the moving speed calculated in the third step as information on a position and a speed of the same object.

In order to achieve the above-mentioned object, according to another embodiment of the present invention, there is provided an object detection device which is mounted to a moving body, the object detection device including a sensor fusion processing unit configured to obtain, from a plurality of object detection units, pieces of information on positions and doppler speeds of objects to be detected existing in a periphery of the moving body, wherein the sensor fusion processing unit includes: a correlation processing unit configured to determine whether the obtained pieces of information are pieces of information obtained from the same object, and apply correlation processing to the pieces of information determined to be obtained from the same object so that the pieces of information are associated with one another; and a smoothing processing unit configured to apply smoothing processing to the positions and the doppler speeds of the same object based on a result of the correlation processing, to thereby calculate information on a position and a speed of the same object.

In order to achieve the above-mentioned object, according to another embodiment of the present invention, there is provided an object detection method which is applied to a moving body, the object detection method including: a first step of obtaining, from a plurality of object detection units, pieces of information on positions and doppler speeds of objects to be detected existing in a periphery of the moving body; a second step of determining whether the pieces of information obtained in the first step are pieces of information obtained from the same object, and applying correlation processing to the pieces of information determined to be obtained from the same object so that the pieces of information are associated with one another; and a third step of applying smoothing processing to the positions and the doppler speeds of the same object based on a result of the correlation processing executed in the second step, to thereby calculate information on a position and a speed of the same object.

Advantageous Effects of Invention

According to the present invention, with any one of the above-mentioned configurations or methods, it is possible to calculate the moving direction and the moving speed of the same object in a short period of time compared with the related art.

DESCRIPTION OF EMBODIMENTS

Figure 1:
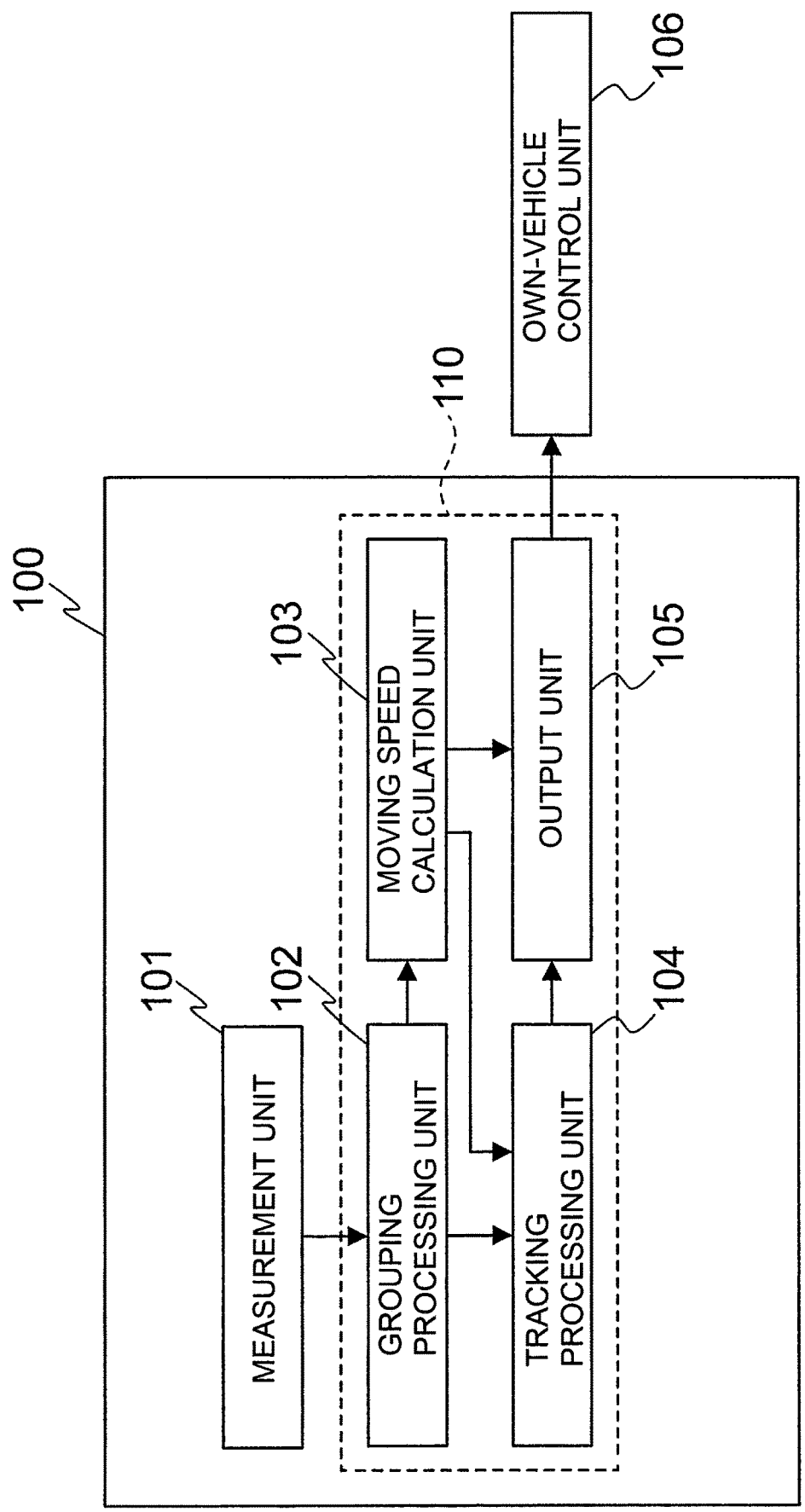
FIG. 1 is a block diagram for illustrating a basic configuration of an object detection device according to a first embodiment of the present invention.

Referring to the drawings, a detailed description is now given of an object detection device and an object detection method according to embodiments of the present invention.

First Embodiment

FIG. 1 is a block diagram for illustrating a basic configuration of an object detection device 100 according to a first embodiment of the present invention.

Referring to FIG. 1, the object detection device 100 includes a measurement unit 101 and a control unit 110. The control unit 110 includes a grouping processing unit 102, a moving speed calculation unit 103, a tracking processing unit 104, and an output unit 105. The output unit 105 is connected to an own-vehicle control unit 106.

The object detection device 100 according to the first embodiment is mounted to, for example, an own vehicle as a moving body, and has a sensor function of transmitting a radio wave and then executing monitoring based on reflected waves acquired from objects to be detected existing in a periphery of the own vehicle. This object detection device 100 is constructed as, for example, a radar device. Thus, in the following, description is given of the object detection device 100 on the assumption that the object detection device 100 has a function of the radar device.

The measurement unit 101 of the object detection device 100 includes a single transmission antenna and a plurality of reception antennas. As a hardware configuration, the control unit 110 mainly includes a dedicated logic circuit and a central processing unit (CPU), and further includes a memory device, an I/O port, a timer, and a counter, for example. Those components are connected to one another through a bus. A read only memory (ROM), a random access memory (RAM), and the like are used for the memory device. Processing to be executed in the grouping processing unit 102, the moving speed calculation unit 103, the tracking processing unit 104, and the output unit 105 of the control unit 110 is executed by, for example, programs written in the ROM.

Description is now given of functions of the respective units. The measurement unit 101 is configured to transmit the radio wave from the transmission antenna to the periphery of the own vehicle at certain cycles. Moreover, the measurement unit 101 is configured to receive reflected waves of the radio wave from the objects to be detected existing in the periphery of the own vehicle through the reception antennas. That is, the measurement unit 101 is configured to generate a beat signal (reception result) of each combination of the transmission antenna and the reception antenna. With this configuration, the measurement unit 101 is configured to detect the reflected wave from the object existing or traveling in the periphery of the own vehicle based on the beat signal through a well-known radar method. The measurement unit 101 is configured to measure a position (distance and azimuth angle) and a doppler speed of the object as a reflection point based on this reflected wave. Further, the measurement unit 101 is configured to output the measured reflection point to the grouping processing unit 102.

Incidentally, the above-mentioned position includes at least a position (longitudinal position) of the reflection point in a travel direction of the own vehicle as seen from the own vehicle and a position (lateral position) of the reflection point in a normal direction of the travel direction of the own vehicle as seen from the own vehicle, and this also holds true below. Alternatively, a distance between the own vehicle and the reflection point and an azimuth of the reflection point as seen from the own vehicle may be considered as the position. The position and the moving speed are a relative position and a relative moving speed between the own vehicle and the object, respectively, unless otherwise specified.

The grouping processing unit 102 is configured to apply grouping processing to the reflection points output from the measurement unit 101. A plurality of reflection points may be acquired in the same cycle. In this case, the grouping processing unit 102 executes grouping processing of forming, as one group, reflection points acquired from the same object among the plurality of reflection points through well-known clustering processing or the like. In this grouping processing, an identifier indicating the same object is assigned to the reflection points belonging to the same group.

In the clustering processing, for example, reflection points existing at positions within a certain threshold value relating to the distance are determined to be reflection points acquired from the same object, and are thus grouped. The threshold value is set based on a measurement accuracy of the position (distance and azimuth angle) of the measurement unit 101 and a design concept of a designer.

When a plurality of reflection points are acquired from one object as a result of the grouping processing by the grouping processing unit 102, the moving speed calculation unit 103 uses doppler speeds and positions of a plurality of pieces of object information, to thereby calculate a moving direction and a moving speed of the same object. $Vd\_i = V \times \cos(\theta\_i - \psi)$, which is Relational Expression (1), is used for this calculation of the moving direction and the moving speed. In Relational Expression (1), a suffix "i" represents an index of a reflection point determined to be acquired from the same object. $Vd\_i$ represents a doppler speed at an i-th reflection point among the reflection points obtained through the grouping processing. $\theta\_i$ represents an azimuth angle at the i-th reflection point among the reflection points obtained through the grouping processing. V represents the relative moving speed with respect to the same object determined through the grouping processing. $\psi$ represents the moving direction of the same object determined through the grouping processing.

When reflection points are acquired from the same object, it is considered that the moving direction $\psi$ and the moving speed V are substantially the same at any reflection points. As many Relational Expressions (1) as the number of the reflection points grouped through the grouping processing are obtained. When those relational expressions are solved as simultaneous equations, the moving direction $\psi$ and the moving speed V of the same object can be calculated.

For example, when the number of the reflection points obtained through the grouping processing is two, $Vd\_1 = V \times \cos(\theta\_1 - \psi)$ set as Relational Expression (2) and $ExVd\_2 = V \times \cos(\theta\_2 - \psi)$ set as Relational Expression (3) are only required to be solved as simultaneous equations. However, when an absolute value of a difference between $\theta\_1$ and $\theta\_2$ is substantially equal to an integer multiple of the circular constant, the simultaneous equations cannot be solved. Therefore, it is considered that only one reflection point is acquired, and this fact is output to the tracking processing unit 104. Which reflection point is to be selected between the two reflection points is only required to be determined based on the design concept of the designer. For example, a reflection point having a shorter distance to the own vehicle may be selected, or a center point of the two reflection points may be selected. A result of this selection is only required to be output to the tracking processing unit 104.

When the number of reflection points obtained through the grouping processing is "n" or more (where "n" is a positive integer equal to or larger than 3), "n" doppler speeds, "n" positions (azimuth angles), and Relational Expressions (1) may be used to obtain the moving direction $\psi$ and the moving speed V through the least-squares method. Alternatively, any two reflection points may be selected among the "n" reflection points, and the moving direction $\psi$ and the moving speed V may be obtained through simultaneous equations formed of the two relational expressions. When the first and m-th reflection points are to be selected as the two reflection points, the two reflection points may be selected so that the absolute value of the difference ($\theta\_1 - \theta\_m$) is close to $(2 \times k + 1) \times \pi/2$ in order to increase a calculation accuracy of the moving speed V.

When only one reflection point is acquired from the same object as a result of the grouping processing by the grouping processing unit 102, the tracking processing unit 104 uses a well-known tracking filter to obtain the position and the speed of the same object. The position of the same object includes the longitudinal position and the lateral position. Moreover, the speed of the same object includes a longitudinal speed and a lateral speed.

At least the longitudinal position, the lateral position, the longitudinal speed, and the lateral position of the same object are required to be input to the tracking filter. However, when only one reflection point is acquired from the same object as a result of the grouping processing by the grouping processing unit 102, the speeds are not input. Therefore, in order to input the speeds to the tracking filter, the speeds are to be obtained from a difference in position, and the obtained speeds are to be input to the tracking filter as observed values of the speeds. When the detection is executed for the first time, the difference in position cannot be calculated, and 0 s are thus input as initial values of the speeds.

In the tracking filter, smoothing processing, prediction processing, and correlation processing are executed. The tracking filter applies the smoothing processing and the prediction processing to the longitudinal position, the lateral position, the longitudinal speed, and the lateral speed (hereinafter referred to as "observed values of the same object"), which are input as observed values, by using the observed values input in the previous cycle or before. After that, the processing of correlating the observed values with obtained predicted values (predicted values of the longitudinal position, the lateral position, the longitudinal speed, and the lateral speed) of the same object is executed. In the correlation processing, when it is estimated that the observed values of the object and the predicted values of the object are acquired from the same object, the observed values and the predicted values are associated with each other.

In the smoothing processing, smoothing (filtering) is applied to the observed values and the predicted values of the same object which are associated with each other through the correlation processing. The longitudinal position, the lateral position, the longitudinal speed, and the lateral speed of the same object smoothed as a result are hereinafter referred to as "smoothed values of the same object". The observed values of the same object that are not associated with the predicted values of the same object in the correlation processing are used as initial values of the smoothed values.

In the prediction processing, the smoothed values of the same object are used to predict the position and the speed of the same object in the next cycle. The tracking processing unit 104 outputs the smoothed values of the same object to the output unit 105 as a processing result. Incidentally, for example, a Kalman filter, an $\alpha$-$\beta$ filter, and an $\alpha$-$\beta$-$\gamma$ filter can be employed as the well-known tracking filter to be used in the tracking processing unit 104.

When the moving direction $\psi$ and the moving speed V of the same object are output from the moving speed calculation unit 103, the output unit 105 converts the moving direction $\psi$ and the moving speed V to a longitudinal speed Vx and a lateral speed Vy of the same object. The longitudinal speed Vx is given by Relational Expression (4) of Vx=V×cos($\psi$). The lateral speed Vy is given by Relational Expression (5) of Vy=V×sin($\psi$).

Moreover, the output unit 105 calculates the longitudinal position and the lateral position of the same object by using the plurality of reflection points determined to be acquired from the same object in the grouping processing unit 102. The output unit 105 outputs the longitudinal position, the lateral position, the longitudinal speed, and the lateral speed to the own-vehicle control unit 106 as information on the position and the speed which are the detection result of the same object obtained as described above.

In order to obtain the longitudinal position and the lateral position of the same object, a plurality of reflection points may be used to freely calculate those positions based on the design concept of the designer. For example, the position of a reflection point having the shortest distance to the own vehicle may be used among the plurality of reflection points. Alternatively, a position of the center of gravity or a position of calculated average of the plurality of reflection points may be used.

Meanwhile, when the smoothed values of the same object are output from the tracking processing unit 104, the output unit 105 outputs the smoothed values of the same object to the own-vehicle control unit 106 as the longitudinal position, the lateral position, the longitudinal speed, and the lateral speed of the same object.

The own-vehicle control unit 106 is configured to control operations (avoidance through acceleration, stopping, and steering) of the own vehicle based on the information (position and speed) on the same object existing or traveling in the periphery of the own vehicle, which is output from the output unit 105.

Incidentally, the following processing is only required to be executed in order to further increase the detection accuracy of the object detection device 100. First, the tracking processing unit 104 obtains the longitudinal speed Vx and the lateral speed Vy from the moving direction $\psi$ and the moving speed V of the same object, which are the results of calculation by the moving speed calculation unit 103, in accordance with Relational Expression (4) and Relational Expression (5), and inputs the longitudinal speed Vx and the lateral speed Vy to the tracking filter as the observed values.

Moreover, as the longitudinal position and the lateral position of the same object as the observed values of the same object to be input to the tracking filter, information on the plurality of reflection points obtained through the grouping processing is used based on the design concept of the designer. As the observed values of the longitudinal position and the lateral position, for example, the position of a reflection point having the shortest distance to the own vehicle may be used among the plurality of reflection points. Alternatively, the position of the center of gravity or the position of calculated average of the plurality of reflection points may be used.

After that, the tracking processing unit 104 applies the above-mentioned well-known tracking filter to the input position and speed of the same object so as to execute the tracking processing, to thereby calculate the position and the speed of the same object, and outputs those results to the output unit 105.

The tracking processing unit 104 may change a filter gain applied to the speed in accordance with the result of the grouping processing input to the moving speed calculation unit 103. That is, the results used to change the gain correspond to the case in which a plurality of reflection points are acquired from the same object and the speed can thus be calculated, and the case in which a plurality of reflection points are not acquired from the same object and the observed value of the speed is thus obtained from a difference in position.

For example, it is considered that the speed obtained by the moving speed calculation unit 103 is more accurate than the speed obtained from the difference in position. Therefore, for example, when the tracking processing unit 104 applies an $\alpha$-$\beta$ filter, it is only required to set a large gain $\beta$ at a time when the speed can be calculated by the moving speed calculation unit 103. Moreover, when the tracking processing unit 104 applies a Kalman filter, it is only required to set small observation noise of the speed at a time when the speed is calculated by the moving speed calculation unit 103.

Similarly, the moving speed calculation unit 103 can calculate the speed more accurately when a larger number of reflection points are acquired from the same object. Therefore, the tracking processing unit 104 may be configured to change the gain for the speed in accordance with the number of reflection points acquired from the same object. For example, the gain is only required to be increased as the number of reflection points acquired from the same object increases.

Moreover, when the three or more reflection points are acquired from the same object, and the speed is thus calculated through the least-squares method in the moving speed calculation unit 103, it is considered that the speed is calculated more accurately as the sum of squares of errors of the respective reflection points with respect to the obtained speed is smaller. Therefore, the gain for the speed may be changed in accordance with the magnitude of the above-mentioned sum of squares of the errors. For example, the gain is only required to be increased as the sum of squares of the errors decreases.

Figure 2:
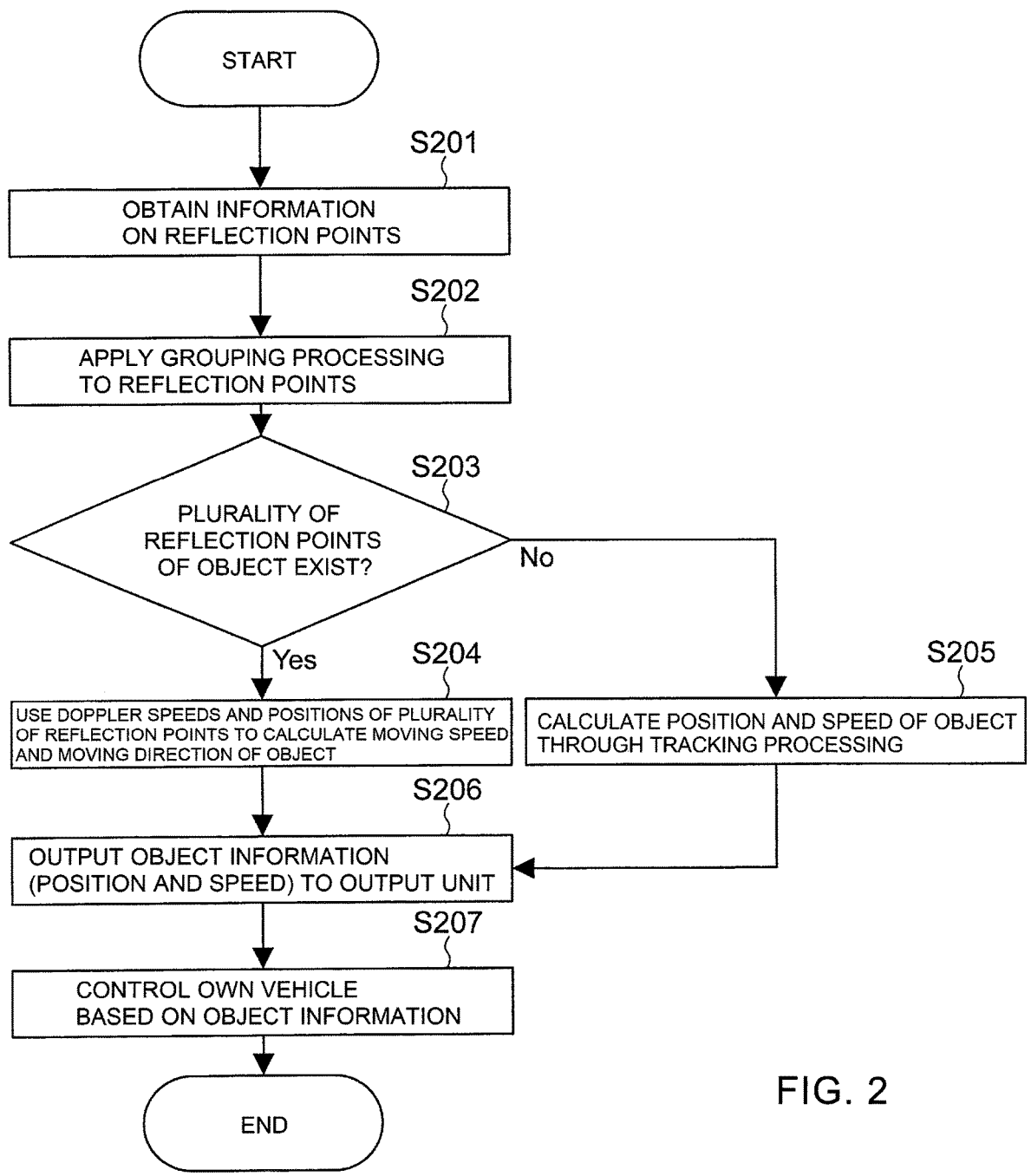
FIG. 2 is a flowchart for illustrating an example of operation processing at a time when the object detection device illustrated in FIG. 1 detects objects.

FIG. 2 is a flowchart for illustrating an example of operation processing at a time when the object detection device 100 detects objects.

Referring to FIG. 2, first, in Step S201, the object detection device 100 uses the measurement unit 101 mounted to the own vehicle to transmit the radio wave from the transmission antenna to objects to be detected existing in the periphery of the own vehicle at certain cycle intervals, and receives reflected waves from the objects at certain cycles. As a result, the information on the reflection points is acquired. The measurement unit 101 measures the position (distance and azimuth angle) and the doppler speed when the information on the reflection point is to be acquired. The measurement unit 101 transmits the detected reflection points to the grouping processing unit 102.

Then, in Step S202, the grouping processing unit 102 applies the above-mentioned clustering processing to the reflection points detected by the measurement unit 101, to thereby execute the grouping processing. Through the execution of this grouping processing, reflection points considered to be acquired from the same object among the plurality of reflection points of the objects are grouped, and are assigned the identifier indicating that those reflection points are determined to be acquired from the same object. After that, the grouping processing unit 102 proceeds to Step S203, and determines whether or not the number of reflection points of each object is two or more. That is, the grouping processing unit 102 determines whether or not a plurality of reflection points are acquired through the grouping processing.

When it is determined that the number of reflection points of each object is two or more as a result of this determination, the grouping processing unit 102 outputs the doppler speeds and the positions, which are the information on the plurality of reflection points, to the moving speed calculation unit 103. On the contrary, when it is determined that the number of reflection points of each object is one, the grouping processing unit 102 outputs the information on this reflection point to the tracking processing unit 104.

When it is determined that the number of reflection points of each object is two or more in accordance with the result of the above-mentioned determination, in Step S204, the moving speed calculation unit 103 uses the doppler speeds and the positions, which are the information on the plurality of reflection points, to thereby calculate the moving speed and the moving direction of the object. On the contrary, when it is determined that the number of reflection points of each object is one in accordance with the determination result, in Step S205, the tracking processing unit 104 calculates the position and the speed of the object through the above-mentioned tracking processing.

After those calculation results are obtained, the object detection device 100 proceeds to Step S206. In Step S206, the moving speed calculation unit 103 outputs the moving speed and the moving direction of each object to the output unit 105 as the information on the position and the speed, which are the detection result of the same object, and the tracking processing unit 104 outputs the position and the speed of each object to the output unit 105. As a result, the processing of outputting the object information (position and speed) to the output unit 105 is executed. The object in this case is the same object.

The output unit 105 outputs to the own-vehicle control unit 106 the moving speed and the moving direction of each object obtained from the moving speed calculation unit 103 and the position and the speed of each object obtained from the tracking processing unit 104.

The own-vehicle control unit 106 proceeds to Step S207 to control operations (avoidance through acceleration, stopping, and steering) of the own vehicle based on the information (position and speed) on the object existing or traveling in the periphery of the own vehicle, which is output from the output unit 105.

Figure 3:
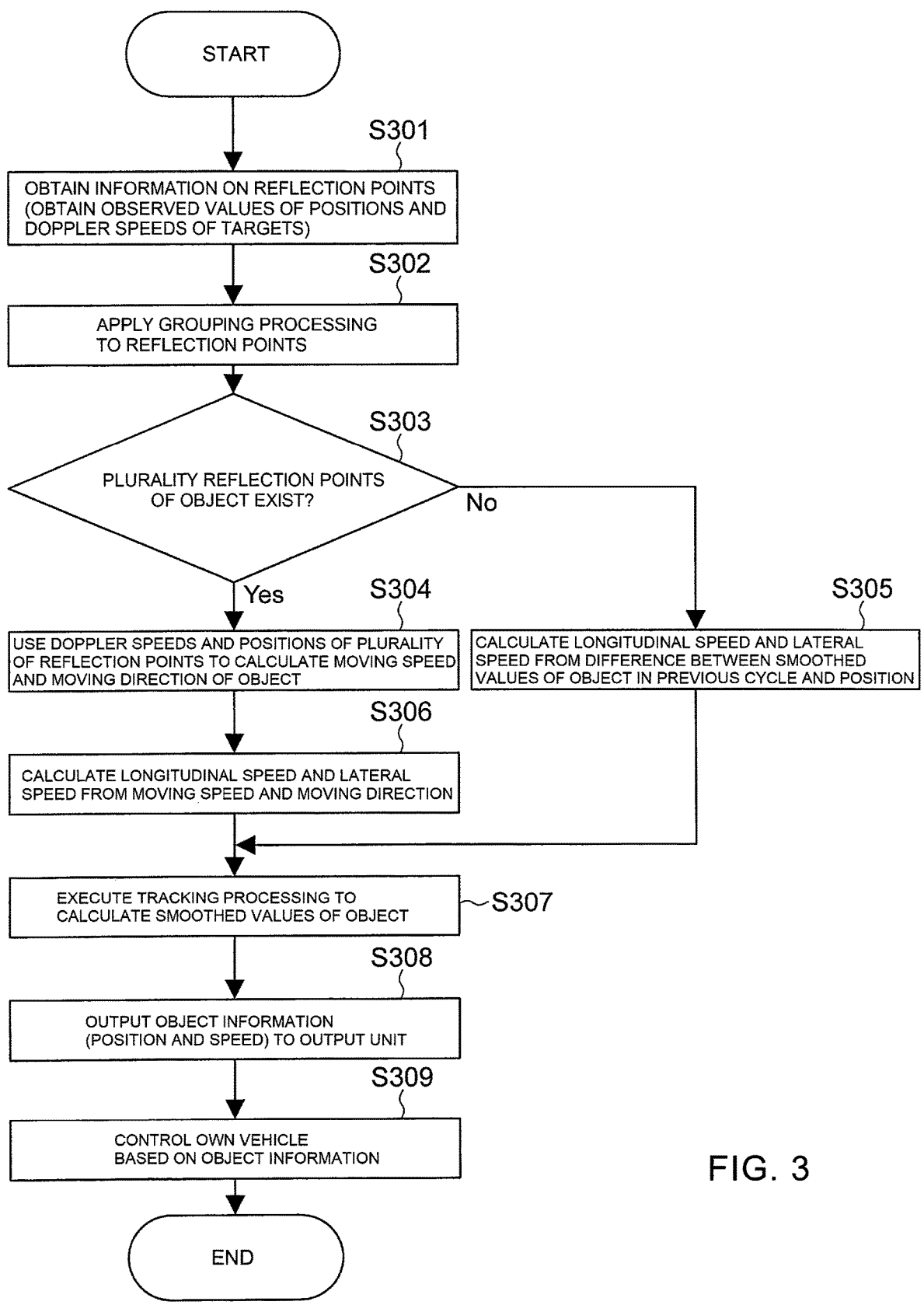
FIG. 3 is a flowchart for illustrating another example of the operation processing at a time when the object detection device illustrated in FIG. 1 detects objects.

FIG. 3 is a flowchart for illustrating another example of the operation processing at a time when the object detection device 100 detects objects. The operation processing of FIG. 3 is intended to further increase the detection accuracy of the operation processing of FIG. 2.

Step S301, Step S302, Step S303, Step S304, Step S308, and Step S309 of FIG. 3 are the same as the operation processing of FIG. 2, and description thereof is therefore omitted. Those steps correspond to Step S201, Step S202, Step S203, Step S204, Step S206, and Step S207 of FIG. 2, respectively.

In FIG. 3, when the number of reflection points of the same object is determined to be one as a result of the determination in Step S303, the object detection device 100 proceeds to Step S305. In Step S305, the tracking processing unit 104 calculates the longitudinal speed and the lateral speed of the object from a difference between correlated smoothed values in the previous cycle and the position in the current cycle of the same object. On the contrary, when the number of reflection points of the same object is determined to be two or more as a result of the determination in Step S303, the object detection device 100 proceeds to Step S306. In Step S306, the tracking processing unit 104 calculates the longitudinal speed and the lateral speed of the object through the above-mentioned method from the moving speed and the moving direction of the object calculated by the moving speed calculation unit 103 in Step S304.

In any cases, the tracking processing unit 104 proceeds to Step S307 after that, and calculates the position of the object through the above-mentioned method from the information on the plurality of reflection points obtained through the grouping processing, and uses the position of the object in addition to the longitudinal speed and the lateral speed of the object as observed values. After that, the tracking processing unit 104 uses a well-known tracking filter to apply tracking processing to the observed values of the position and the speed, and outputs smoothed values of the position and the speed obtained through this processing to the output unit 105.

According to the object detection device 100 of the first embodiment, irrespective of whether the operation processing illustrated in FIG. 2 or the operation processing illustrated in FIG. 3 is applied, the moving direction and the moving speed of the object can be detected in a shorter period of time than that of a related art. As a result, the position and the speed of the object can be detected accurately.

Figure 4:
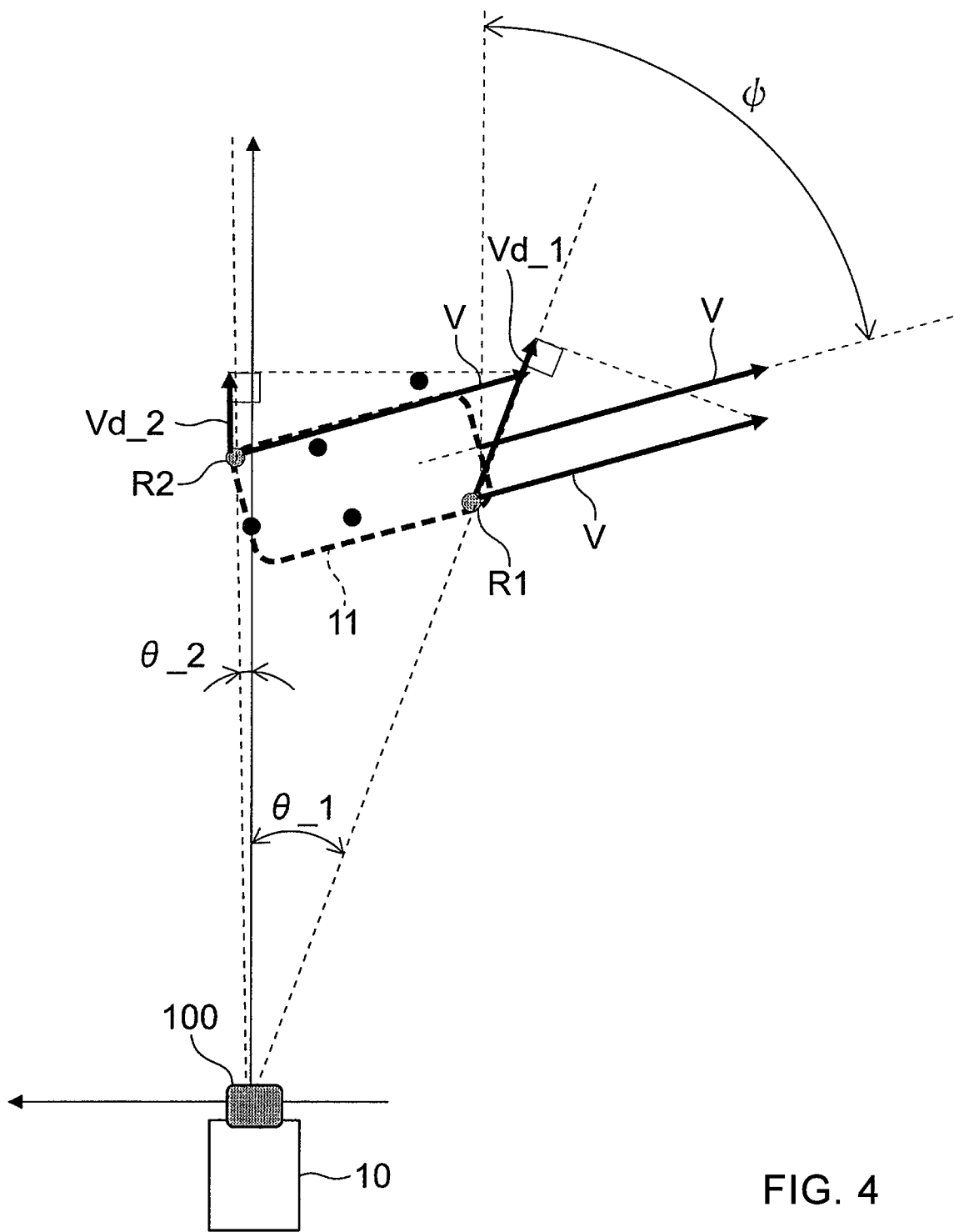
FIG. 4 is a schematic diagram for illustrating an overview of the object detection in a case where the object detection device illustrated in FIG. 1 is mounted to an own vehicle as a moving body, and an object in a periphery of the own vehicle is another automobile.

FIG. 4 is a schematic diagram for illustrating an overview of the object detection in a case where the object detection device 100 according to the first embodiment is mounted to an own vehicle 10 as a moving body, and an object in the periphery of the own vehicle 10 is another automobile 11.

Referring to FIG. 4, a state in which the object detection device 100 mounted to the own vehicle 10 detects the automobile 11 as an object is illustrated. The object detection device 100 applies the grouping processing to reflection points R1 and R2 at both end edges of the automobile 11 based on positions (distance between the reflection points), to thereby calculate the moving speed V and the moving direction $\psi$ from doppler speeds $Vd\_i$ and azimuth angles $\theta\_i$ of the plurality of reflection points.

That is, the azimuth angle at the reflection point R1 is $\theta\_1$, and the azimuth angle at the reflection point R2 is $\theta\_2$. Therefore, Relational Expression (2) of $Vd\_1=V\times\cos(\theta\_1-\psi)$ and Relational Expression (3) of $Vd\_2=V\times\cos(\theta\_2-\psi)$ are only required to be solved as simultaneous equations. As a result, the doppler speed $Vd\_1$ at the azimuth angle $\theta\_1$ relating to the reflection point R1, the moving speed V, and the moving direction $\psi$ are detected. Moreover, the doppler speed $Vd\_2$ at the azimuth angle $\theta\_2$ relating to the reflection point R2, the moving speed V, and the moving direction $\psi$ are detected.

The object detection function of the object detection device 100 according to the first embodiment can also be considered as an object detection method, which is applied to a moving body. This object detection method includes a first step of transmitting the radio wave to measure, based on the reflected wave acquired from an object to be detected existing in the periphery of the moving body, the position and the doppler speed of the object at the reflection point.

This first step is executed by the measurement unit 101 included in the object detection device 100.

Moreover, the object detection method includes a second step of executing, when a plurality of reflection points are acquired as the reflection points in the first step, the grouping processing of determining whether the plurality of reflection points are acquired from the same object, and forming groups each including reflection points determined to be acquired from the same object. This second step is executed by the grouping processing unit 102 of the control unit 110 included in the object detection device 100.

Further, the object detection method includes a third step of using the doppler speeds and the positions of the plurality of reflection points of the same object based on the result of the grouping processing, to thereby calculate the moving direction and the moving speed of the same object. This third step is executed by the moving speed calculation unit 103 of the control unit 110 included in the object detection device 100.

Still further, the object detection method includes a fourth step of outputting the moving direction and the moving speed calculated in the third step as the information on the position and the speed of the same object. This fourth step is executed by the output unit 105 of the control unit 110 included in the object detection device 100.

Second Embodiment

Figure 5:
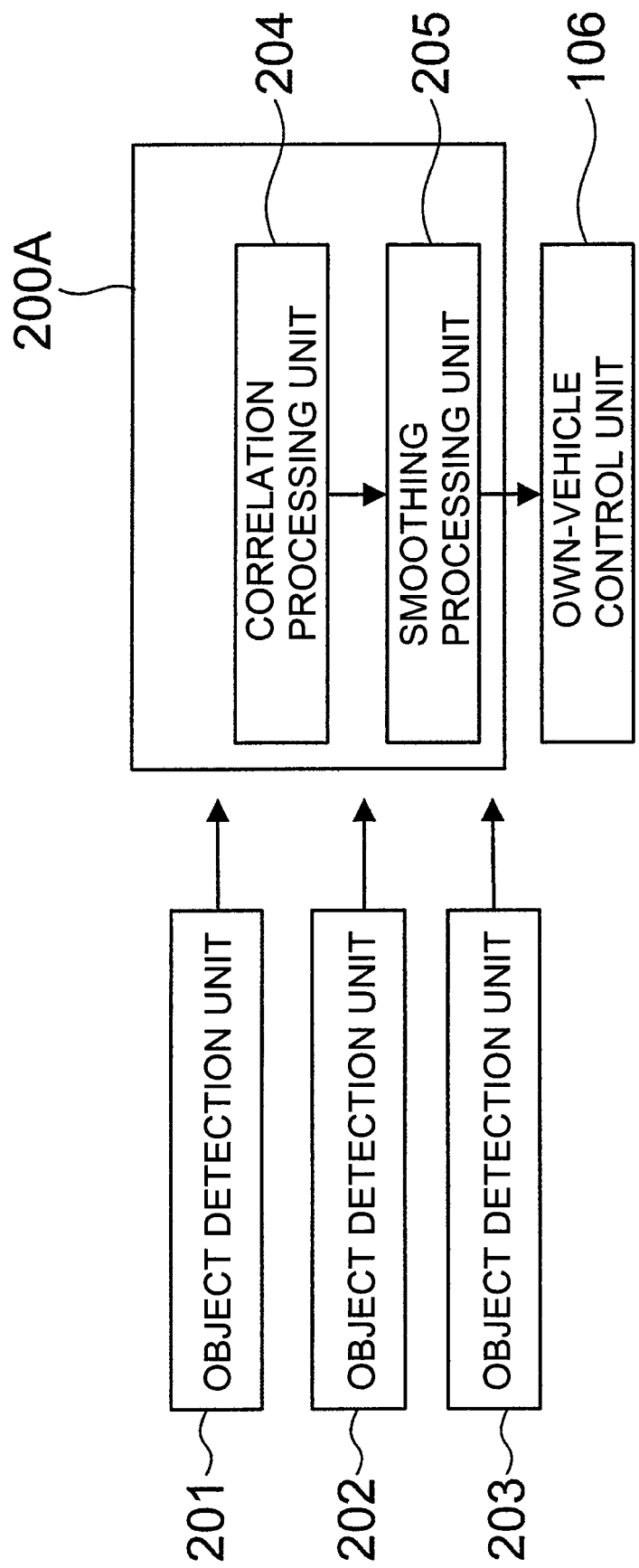
FIG. 5 is a block diagram for illustrating an example of a basic configuration of the object detection device according to a second embodiment of the present invention.

FIG. 5 is a block diagram for illustrating one example of a basic configuration of an object detection device 100A according to a second embodiment of the present invention.

Referring to FIG. 5, the object detection device 100A includes a plurality of (three in this case) object detection units 201 to 203 and a sensor fusion processing unit 200A. The object detection units 201 to 203 are configured to obtain the information on the positions and the doppler speeds of objects to be detected existing in the periphery of the own vehicle. The sensor fusion processing unit 200A is configured to process information on the positions and the doppler speeds of the objects obtained by those object detection units 201 to 203.

That is, each of the object detection units 201 to 203 in this configuration is an object detection sensor, for example, a radar, which is capable of outputting, at certain cycles, results of measurement of at least the position (longitudinal position and lateral position), the speed (longitudinal speed and lateral speed), and the doppler speed of each object in the periphery of the own vehicle.

The sensor fusion processing unit 200A is configured to execute sensor fusion processing through a well-known sensor fusion technology. The sensor fusion technology is a technology of fusing a plurality of sensor outputs (positions and speeds), to thereby process the sensor outputs in combination based on measurement accuracies and the like of the respective sensors. For example, a case in which the sensor outputs are weighted depending on relative positions of the respective sensors, and then are averaged can be exemplified. As a result, a more accurate detection result can be obtained.

The sensor fusion processing unit 200A is constructed of a correlation processing unit 204 and a smoothing processing unit 205. The correlation processing unit 204 is configured to determine whether pieces of information are obtained from the same object, and to apply correlation processing to pieces of information determined to be obtained from the same object so that those pieces of information are associated with one another. The smoothing processing unit 205 is configured to apply smoothing processing to the positions and the doppler speeds obtained from the same object based on a result of the correlation processing, to thereby calculate information on a position and a speed of the same object.

Specifically, the correlation processing unit 204 is configured to associate pieces of information considered to be obtained from the same object with one another among a plurality of pieces of object information output from the object detection units 201 to 203. As this association, there can be exemplified a case in which a distance between a position of an object output from the object detection unit 201 and a position of an object output from the object detection unit 202 is smaller than a certain threshold value, and this combination has the shortest distance among a plurality of combinations of the objects. Alternatively, there can be exemplified a case in which a distance and a difference in speed between a position of an object output from the object detection unit 201 and a position of an object output from the object detection unit 202 are smaller than respective set threshold values, and this combination has the shortest distance and the smallest square sum of the difference in speed among a plurality of combinations of the objects.

The correlation processing unit 204 is configured to execute this association for each of the combinations between the object detection units 201 to 203. The correlation processing unit 204 is configured to output the plurality of pieces of object information output from the object detection units 201 to 203 to the smoothing processing unit 205 together with results of the association.

The smoothing processing unit 205 uses the plurality of pieces of associated object information on each associated object among the object information output from the correlation processing unit 204 to calculate the longitudinal position, the lateral position, the longitudinal speed, and the lateral speed of the object.

The smoothing processing unit 205 is configured to use the plurality of associated positions of the object, to thereby calculate a smoothed value of the above-mentioned positions of the object. The estimated value of the position is calculated through, for example, calculation of a weighted average value of the plurality of positions of the object. The weighting is executed based on the measurement accuracy or the like by increasing the weight of the position of the object obtained from any one of the object detection units 201 to 203 having a higher detection accuracy, for example.

The smoothing processing unit 205 is configured to use the plurality of longitudinal positions and lateral positions relating to the azimuth angles and doppler speeds of the object associated with each other by the correlation processing unit 204, and Relational Expressions (1) described in the first embodiment to calculate the moving direction $\psi$ and the moving speed V of the object.

When the object information obtained from the object detection units 201 to 203 is obtained from the same object, it is considered that the moving speed V and the moving direction $\psi$ are also substantially the same among the object information obtained from any one of the object detection units 201 to 203.

As many Relational Expressions (1) as the number of pieces of associated object information are obtained. The moving speed V and the moving direction $\psi$ can be calculated by solving Relational Expressions (1) as simultaneous equations. For example, when the number of pieces of associated object information is two, Relational Expression (2) and Relational Expression (3) described in the first embodiment are only required to be solved as simultaneous equations. Specifically, there can be exemplified a case in which pieces of object information obtained from the object detection unit 201 and the object detection unit 202 are associated with each other, but object information obtained from the object detection unit 203 is not associated.

When the number of pieces of associated object information is "n" or more ("n" is a positive integer equal to or larger than 3), "n" doppler speeds, "n" positions (azimuth angles), and Relational Expressions (1) may be used to obtain the moving speed V and the moving direction $\psi$ through the least-squares method. Alternatively, any two pieces of object information may be selected among the "n" pieces of object information, and the moving speed V and the moving direction; may be obtained through simultaneous equations formed of the two relational expressions. When two pieces of object information are selected, the two pieces of object information may be selected so that the absolute value of the difference $(\theta\_1-\theta\_m)$ is close to $(2\times k+1)\times\pi/2$ in order to increase a calculation accuracy of the moving speed V.

The smoothing processing unit 205 is configured to use the calculated moving speed V and moving direction $\psi$ of the object to calculate the longitudinal speed Vx and the lateral speed Vy in accordance with Relational Expression (4) and Relational Expression (5) described in the first embodiment, to output the longitudinal speed Vx and the lateral speed Vy to the own-vehicle control unit 106 together with the above-mentioned estimated value of the position of the object. Meanwhile, when the correlation processing is not applied to the object information by the correlation processing unit 204, the smoothing processing unit 205 directly outputs the longitudinal position, the lateral position, the longitudinal speed, and the lateral speed of this object information to the own-vehicle control unit 106.

The own-vehicle control unit 106 is configured to control the operations (avoidance through acceleration, stopping, and steering) of the own vehicle based on the position and speed information on the objects existing or traveling in the periphery of the own vehicle.

Figure 6:
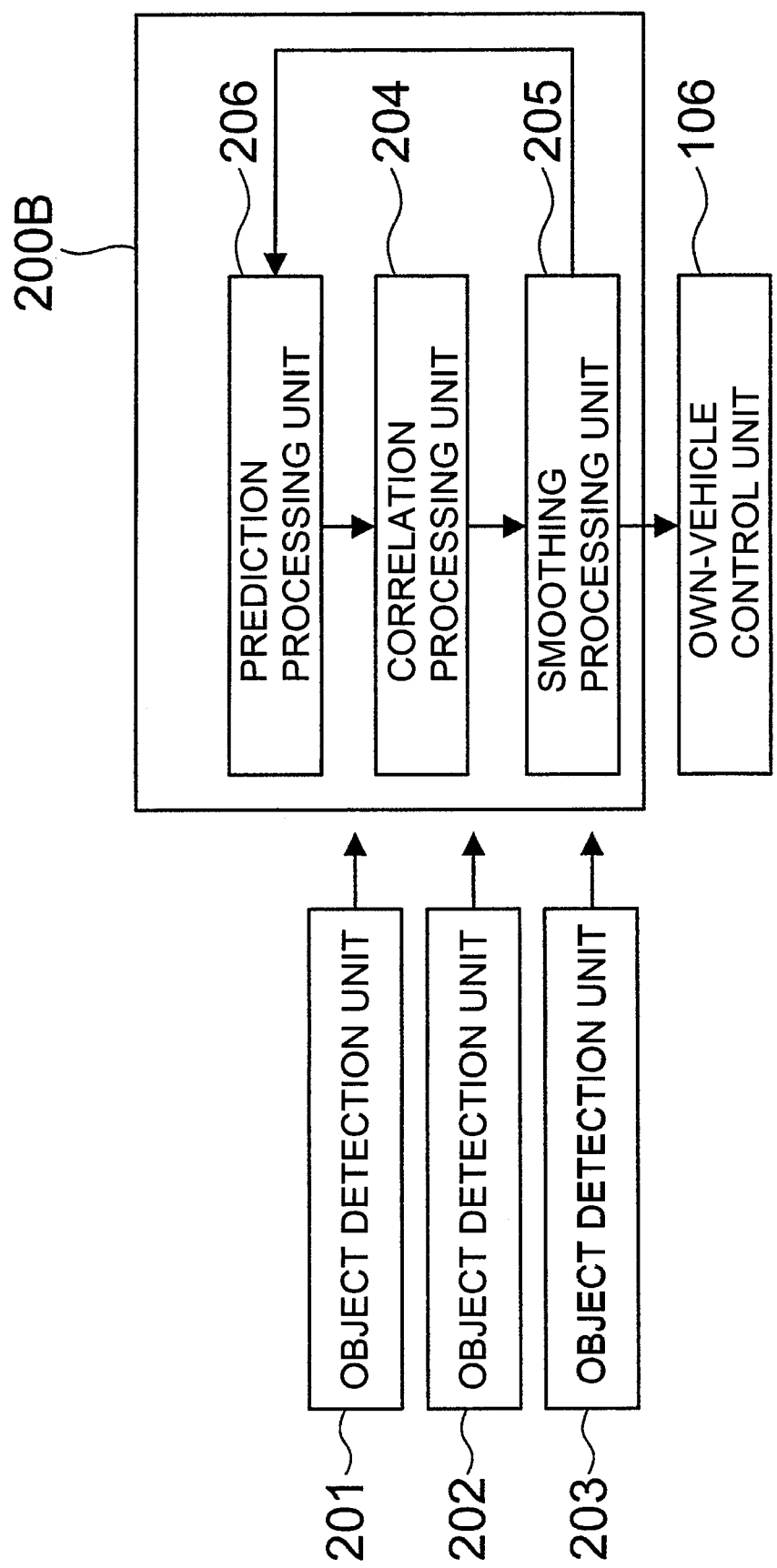
FIG. 6 is a block diagram for illustrating another example of the basic configuration of the object detection device according to the second embodiment of the present invention.

FIG. 6 is a block diagram for illustrating another example of the basic configuration of an object detection device 100B according to the second embodiment of the present invention.

Referring to FIG. 6, this object detection device 100B is different from the object detection device 100A in that the object detection device 100B includes a prediction processing unit 206 in addition to the correlation processing unit 204 and the smoothing processing unit 205 in order to further increase the detection accuracy in a sensor fusion processing unit 200B. A well-known tracking filter is used for the smoothing processing unit 205 to execute the sensor fusion processing. An $\alpha$-$\beta$ filter and an $\alpha$-$\beta$-$\gamma$ filter can be employed as the tracking filter in addition to a Kalman filter configured to input the position.

When it can be estimated that predicted values of an object calculated by the prediction processing unit 206 in the previous cycle and object information output from the object detection units 201 to 203 are obtained from the same object, the correlation processing unit 204 associates the predicted values and the object information with each other in the sensor fusion processing unit 200B. The above-mentioned method can be applied to this association. The smoothing processing unit 205 is configured to use the predicted values of the object and the object information output from the object detection units 201 to 203 associated with each other in the correlation processing unit 204 to execute smoothing (filtering processing), to thereby calculate smoothed vales of the object. The longitudinal position, the lateral position, the longitudinal speed, and the lateral speed after the smoothing may be referred to as the smoothed values of the object.

In this configuration, the longitudinal speed and the lateral speed calculated in accordance with Relational Expression (1), Relational Expression (4), and Relational Expression (5) described in the first embodiment, the longitudinal speed and the lateral speed of the predicted values, and the longitudinal speeds and the lateral speeds of the object information, which are output from the object detection units 201 to 203 and associated with the predicted values, are obtained. That is, a maximum of five longitudinal speeds and a maximum of five lateral speeds are to be obtained. The smoothing processing unit 205 uses the obtained respective longitudinal speeds and lateral speeds to execute the smoothing, to thereby obtain the smoothed values of the longitudinal speed and the lateral speed. In this configuration, the smoothing also refers to, for example, the weighted averaging. Moreover, the prediction processing unit 206 is configured to use the smoothed values of the object obtained by the smoothing processing unit 205 to calculate predicted values of the position and the speed for the next cycle. The smoothing processing unit 205 outputs the obtained smoothed values of the object to the own-vehicle control unit 106.

In the smoothing processing unit 205, a filter gain for the smoothing may be changed between the case in which the smoothing is applied to the longitudinal speed and the lateral speed calculated in accordance with Relational Expression (1), Relational Expression (4), and Relational Expression (5) and the case in which the smoothing is applied to the other longitudinal speeds and lateral speeds. For example, it is considered that the longitudinal speed and the lateral speed calculated through those relational expressions have higher accuracies than those of the longitudinal speeds and the lateral speeds of the object information obtained from the object detection units 201 to 203. Therefore, for example, when the tracking filter used in the smoothing processing unit 205 is, for example, an $\alpha$-$\beta$ filter, gains $\beta$ applied to the longitudinal speed and the lateral speed calculated through those relational expressions are only required to be increased. Moreover, when the tracking filter used in the smoothing processing unit 205 is a Kalman filter, observation noises applied to the longitudinal speed and the lateral speed calculated through those relational expressions are only required to be set to be small.

Similarly, the longitudinal speed and the lateral speed calculated in accordance with Relational Expression (1), Relational Expression (4), and Relational Expression (5) can be calculated more accurately when a larger amount of object information associated with one object is obtained. Therefore, the gains for the speeds may be changed in accordance with the number of pieces of object information obtained from one object in the correlation processing unit 204. For example, the gains are only required to be increased as the number of reflection points acquired from one object increases. Further, when the three or more reflection points are acquired in order to calculate the longitudinal speed and the lateral speed through those relational expressions, and the speeds are thus calculated through the least-squares method, it is considered that the speeds are calculated more accurately as the sum of squares of errors of the object information with respect to the obtained speeds is smaller. Therefore, the gains for the speeds may be changed in accordance with the magnitude of the sum of squares of the errors. For example, the gains are only required to be increased as the sum of squares of the errors decreases.

Figure 7:
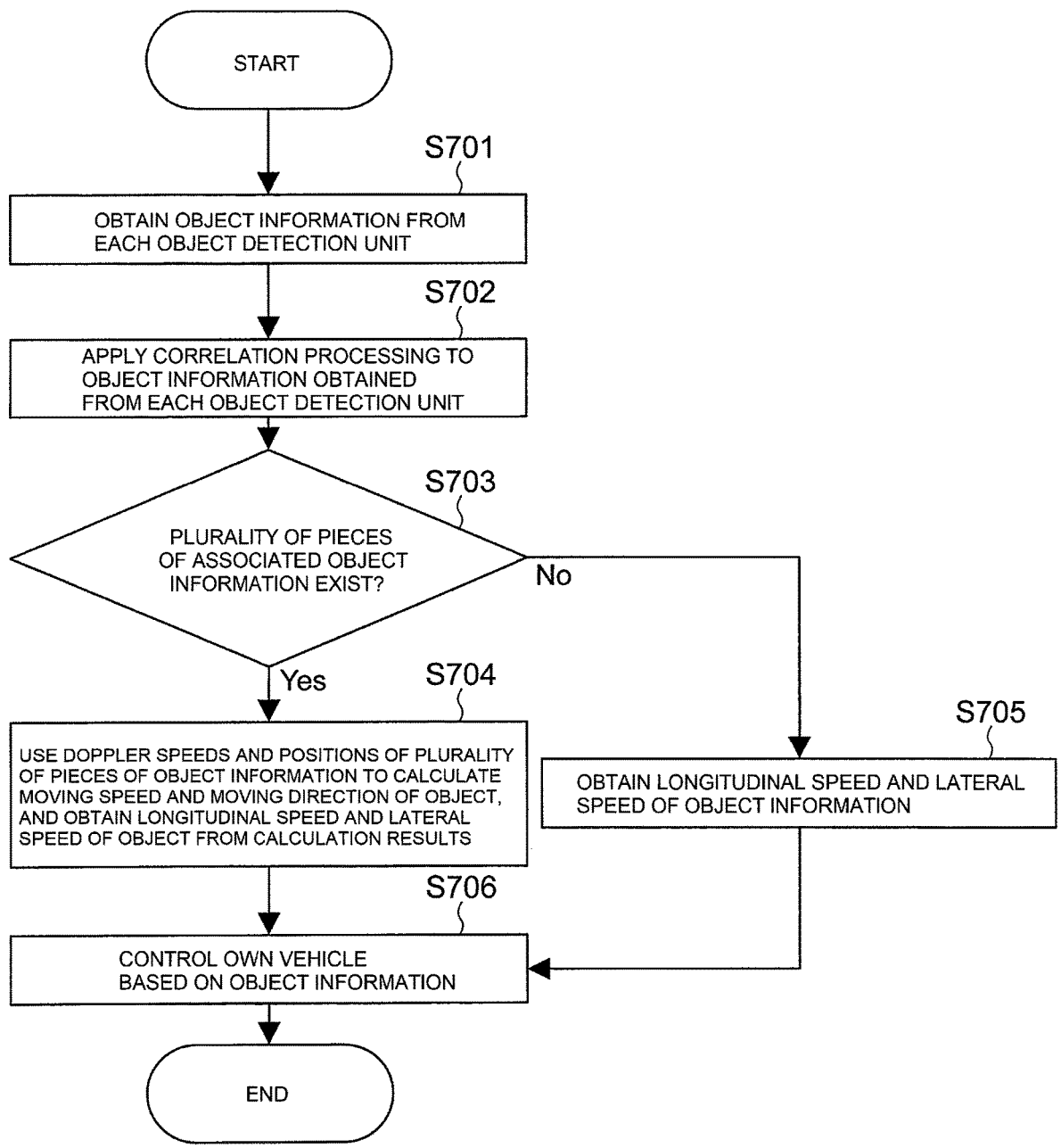
FIG. 7 is a flowchart for illustrating the operation processing at a time when the object detection device illustrated in FIG. 5 detects objects.

FIG. 7 is a flowchart for illustrating operation processing at a time when the above-mentioned object detection device 100A detects objects.

Referring to FIG. 7, first in Step S701, information on objects existing in the periphery of the own vehicle detected by the respective object detection units 201 to 203 mounted to the own vehicle is obtained by the sensor fusion processing unit 200A of the object detection device 100A. The object information output by each of the object detection units 201 to 203 includes at least the position (the distance and the azimuth angle), the doppler speed, the longitudinal speed, and the lateral speed of each object.

Then, in Step S702, the correlation processing unit 204 applies the above-mentioned correlation processing to the object information obtained from the respective object detection units 201 to 203. When it is estimated that pieces of information among the plurality of pieces of object information obtained from the respective object detection units 201 to 203 are obtained from the same object, those pieces of information are associated with one another through the execution of this correlation processing, and an identifier indicating that those pieces of information are obtained from the same object is assigned to those pieces of information. After that, the correlation processing unit 204 proceeds to Step S703, and determines whether or not the number of the pieces of object information associated with each other is two or more.

As a result of this determination, when a plurality of pieces of object information are obtained from the same object, the correlation processing unit 204 outputs the plurality of pieces of object information to the smoothing processing unit 205. On the contrary, as a result of the determination, when only one piece of object information is obtained from the same object, the correlation processing unit 204 outputs the one piece of object information to the smoothing processing unit 205.

When it is determined that a plurality of pieces of object information are obtained from the same object, the smoothing processing unit 205 proceeds to Step S704, and uses the doppler speeds and the positions of the plurality of pieces of object information to calculate the moving speed and the moving direction of the object, and obtains the longitudinal speed and the lateral speed of the object from the calculation results. Further, the smoothing processing unit 205 applies the smoothing processing to the obtained longitudinal speed and lateral speed, which are the observed values, the positions and the speeds of the object obtained from the respective object detection units 201 to 203, and the predicted values of the object through the above-mentioned method, and the smoothed values of the position and the speed axe then calculated through the tracking processing. On the contrary, when it is determined that one piece of object information is obtained from the same object, the smoothing processing unit 205 obtains the longitudinal speed and the lateral speed of the object through the above-mentioned method. The smoothing processing unit 205 outputs the smoothed values to the own-vehicle control unit 106 for any one of the calculation results.

The own-vehicle control unit 106 proceeds to Step S706, and controls the operations (avoidance through acceleration, stopping, and steering) of the own vehicle based on the smoothed value information (positions and speeds) on objects existing or traveling in the periphery of the own vehicle output from the smoothing processing unit 205.

Figure 8:
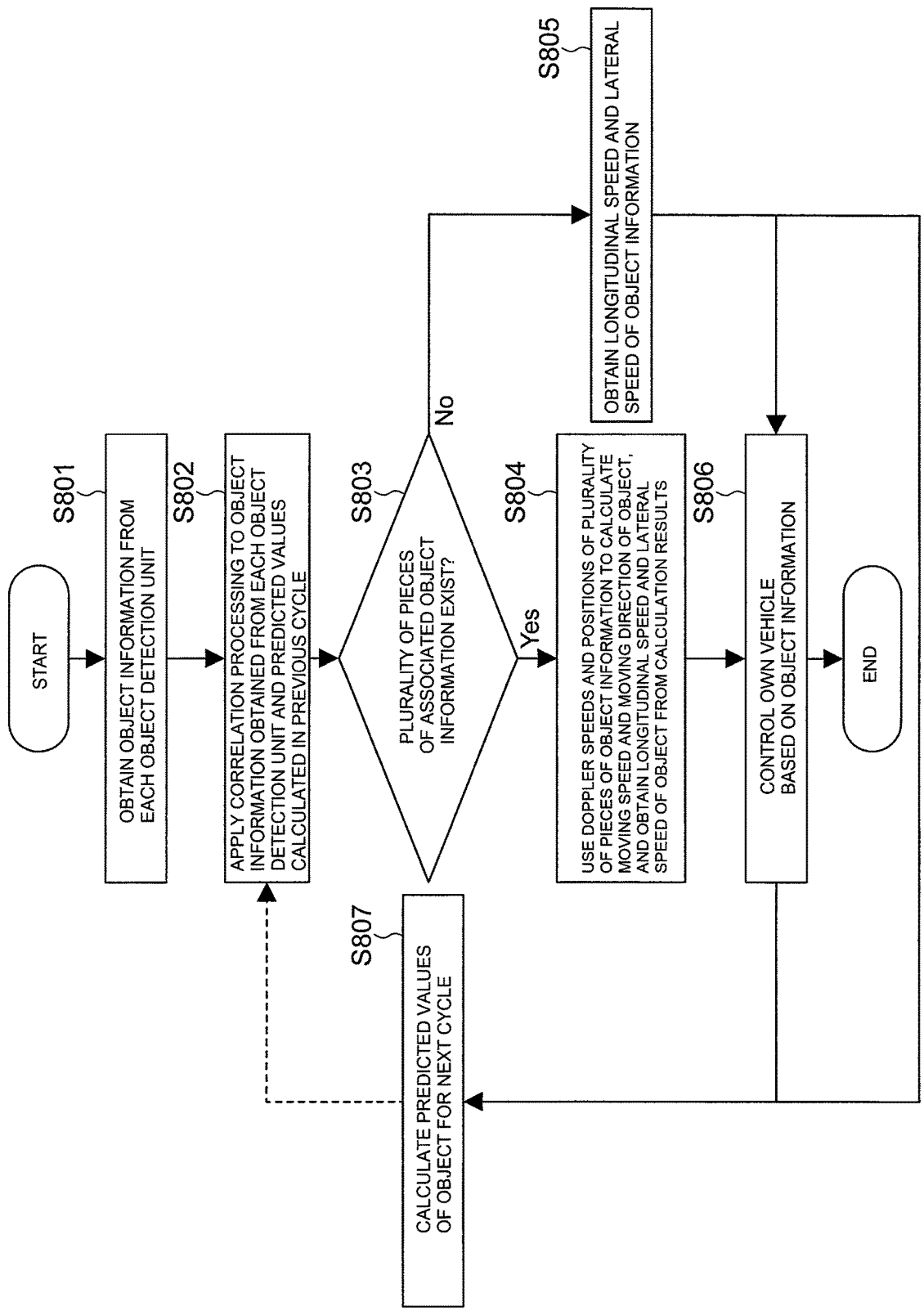
FIG. 8 is a flowchart for illustrating the operation processing at a time when the object detection device illustrated in FIG. 6 detects objects.

FIG. 8 is a flowchart for illustrating the operation processing at a time when the above-mentioned object detection device 100B detects objects. The operation processing of FIG. 8 is intended to further increase the detection accuracy of the operation processing of FIG. 7.

Referring to FIG. 8, first, in Step S801, information on objects existing in the periphery of the own vehicle detected by the respective object detection units 201 to 203 mounted to the own vehicle is obtained by the sensor fusion processing unit 200B of the object detection device 100B. The object information output by each of the object detection units 201 to 203 includes at least the position (the distance and the azimuth angle), the doppler speed, the longitudinal speed, and the lateral speed of each object.

After that, in Step 3802, the correlation processing unit 204 applies the correlation processing to the object information obtained from the respective object detection units 201 to 203 and the predicted values of objects calculated by the prediction processing unit 206 in the previous cycle. When it is estimated that pieces of information among the plurality of pieces of object information obtained from the respective object detection units 201 to 203 are obtained from the same object, those pieces of information are associated with one another through the execution of this correlation processing, and an identifier indicating that those pieces of information are obtained from the same object is assigned to those pieces of information. After that, the correlation processing unit 204 proceeds to Step S803, and determines whether or not the number of the pieces of object information associated with each other is two or more.

As a result of this determination, when a plurality of pieces of object information are obtained from the same object, the correlation processing unit 204 outputs the plurality of pieces of object information to the smoothing processing unit 205. On the contrary, as a result of the determination, when only one piece of object information is obtained from the same object, the correlation processing unit 204 outputs the one piece of object information to the smoothing processing unit 205.

When it is determined that a plurality of pieces of object information are obtained from the same object, the smoothing processing unit 205 proceeds to Step S904, and uses the doppler speeds and the positions of the plurality of pieces of object information to calculate the moving speed and the moving direction of the object, and obtains the longitudinal speed and the lateral speed of the object from the calculation results. Further, the smoothing processing unit 205 applies the smoothing processing to the obtained longitudinal speed and lateral speed, which are the observed values, the positions and the speeds of the object obtained from the respective object detection units 201 to 203, and the predicted values of the object through the above-mentioned method, and the smoothed values of the position and the speed are then calculated through the tracking processing. On the contrary, when it is determined that one piece of object information is obtained from the same object, the smoothing processing unit 205 obtains the longitudinal speed and the lateral speed of the object through the above-mentioned method. The smoothing processing unit 205 outputs the smoothed values to the own-vehicle control unit 106 for any one of the calculation results.

The own-vehicle control unit 106 proceeds to Step S806, and controls the operations (avoidance through acceleration, stopping, and steering) of the own vehicle based on the smoothed value information (positions and speeds) on objects existing or traveling in the periphery of the own vehicle output from the smoothing processing unit 205.

Further, the information (positions and speeds) of the smoothed values of the objects output from the smoothing processing unit 205 is input to the prediction processing unit 206. Thus, in Step S807, the prediction processing unit 206 uses the smoothed values from the smoothing processing unit 205, to thereby calculate the predicted positions of the objects for the next cycle. The calculation results of the predicted positions of the objects for the next cycle are output to the correlation processing unit 204.

According to the object detection devices 100A and 100B of the second embodiment, irrespective of whether the operation processing illustrated in FIG. 7 or the operation processing illustrated in FIG. 8 is applied, the moving direction and the moving speed of the object can be detected in a shorter period of time than that of the related art. As a result, the position and the speed of the object can be detected accurately.

Figure 9:
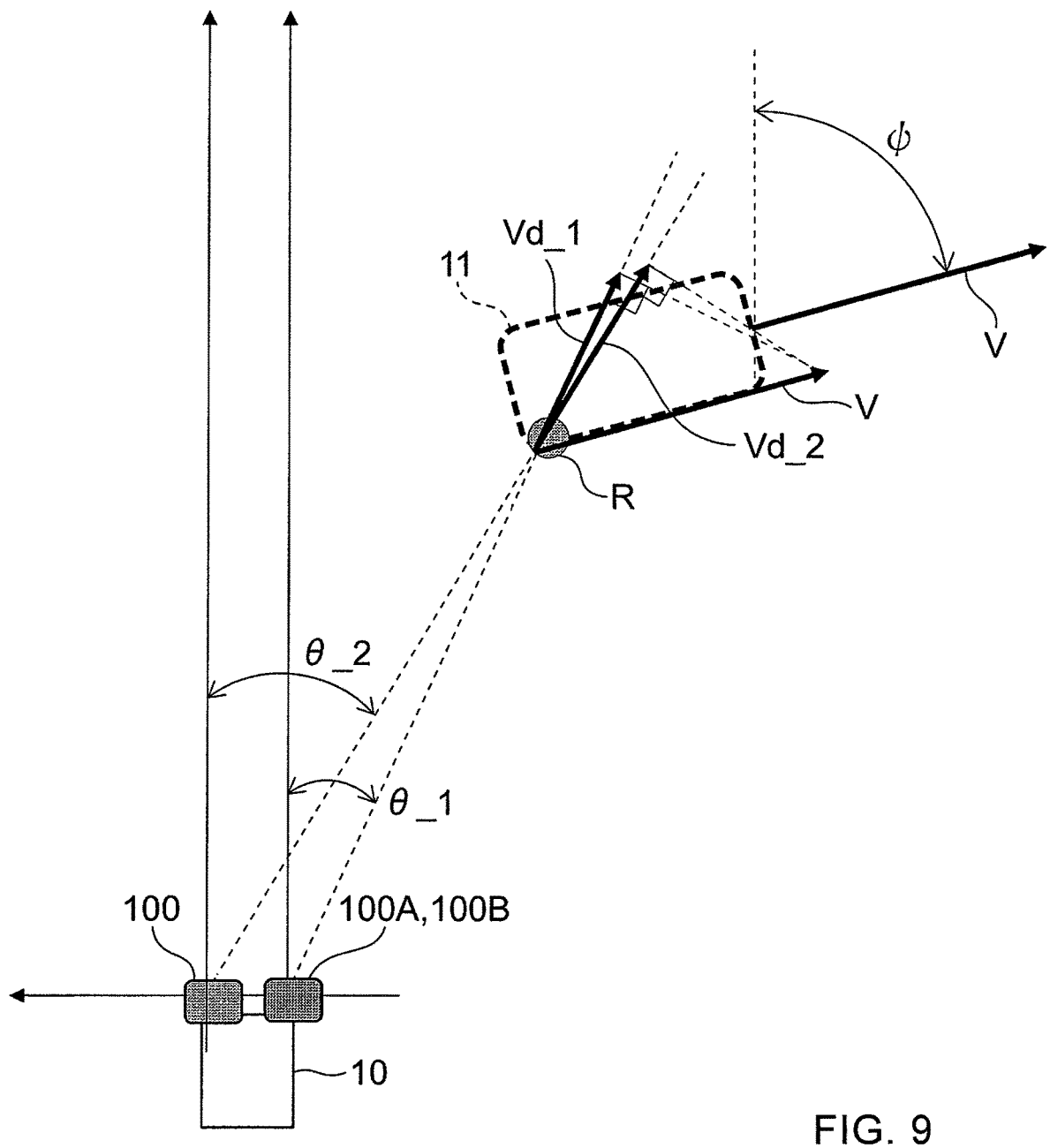
FIG. 9 is a schematic diagram for illustrating an overview of the object detection in a case where the object detection device illustrated in FIG. 1 and the object detection device illustrated in FIG. 5 or FIG. 6 are mounted to the own vehicle as the moving body, and the object in the periphery of the own vehicle is another automobile.

FIG. 9 is a schematic diagram for illustrating an overview of the object detection in a case where the object detection device 100 according to the first embodiment and the object detection device 100A or the object detection device 100B according to the second embodiment are mounted to the own vehicle 10 as the moving body, and the object in the periphery of the own vehicle 10 is the another automobile 11.

Referring to FIG. 9, there is illustrated a state in which the object detection device 100 and the object detection device 100A or the object detection device 100B mounted to the own vehicle 10 detect the automobile 11, which is the object in the periphery. The object detection device 100 and the object detection device 100A or the object detection device 100B apply the grouping processing to a reflection point R in one edge portion of the automobile 11 based on the position (distance between the object detection devices), to thereby calculate the moving speed V and the moving direction ψ from the plurality of doppler speeds Vd_i and azimuth angles θ_i of the plurality of reflection points.

That is, the azimuth angle of the reflection point R is θ_1 at the object detection device 100A or the object detection device 100B. The azimuth angle of the reflection point R is θ_2 at the object detection device 100. Therefore, Relational Expression (2) of Vd_1=V×cos(θ_1−ψ) and Relational Expression (3) of Vd_2=V×cos(θ_2−ψ) described above are only required to be solved as simultaneous equations. As a result, the doppler speed Vd_1 at the azimuth angle θ_1 relating to the reflection point R detected by the object detection device 100A or the object detection device 100B, the moving speed V, and the moving direction ψ are detected. Moreover, the doppler speed Vd_2 at the azimuth angle θ_2 relating to the reflection point R detected by the object detection device 100, the moving speed V, and the moving direction ψ are detected.

The object detection function implemented by the object detection device 100 and the object detection device 100A or the object detection device 100B according to the second embodiment can also be considered as an object detection method, which is applied to a moving body. This object detection method includes a first step of obtaining the information on the positions and the doppler speeds of objects to be detected existing in the periphery of the moving body from the plurality of object detection units. That is, this first step is executed by the respective object detection units 201 to 203 included in the object detection device 100A or 100B.

Moreover, this object detection method includes a second step of determining whether the pieces of information obtained in the first step are pieces of information obtained from the same object, and applying the correlation processing to pieces of information determined to be obtained from the same object so that those pieces of information are associated with one another. This second step is implemented by the correlation processing unit 204 of the sensor fusion processing unit 200A or 200B included in the object detection device 100A or 100B.

Further, this object detection method includes a third step of applying smoothing processing to the positions and the doppler speeds of the same object, to thereby calculate the information on the position and the speed of the same object based on the result of the correlation processing in the second step. This third step is implemented by the smoothing processing unit 205 of the sensor fusion processing unit 200A or 200B included in the object detection device 100A or 100B.

REFERENCE SIGNS LIST 10 own vehicle, 100, 100A, 100B object detection device, 101 measurement unit, 102 grouping processing unit, 103 moving speed calculation unit, 104 tracking processing unit, 105 output unit, 106 own-vehicle control unit, 110 control unit, 200A, 200B sensor fusion processing unit, 201 to 203 object detection unit, 204 correlation processing unit, 205 smoothing processing unit, 206 prediction processing unit.

The invention claimed is:

1. An object detection device which is mounted to a moving body, the object detection device comprising one or more processors configured to:
control transmission of a radio wave to measure, based on a reflected wave acquired from a plurality of objects to be detected existing in a periphery of the moving body, a position and a doppler speed of each of the plurality of objects;
execute grouping processing of determining that a plurality of reflection points are acquired from a first object, and a single reflection point is acquired from a second object, among the plurality of objects;
calculate a moving direction and a moving speed of the first object by using the doppler speeds and the positions of the plurality of reflection points of the first object;
calculate a moving direction and a moving speed of the second object by using a difference in positions acquired in two consecutive cycles,
apply different filter gains to the moving speed of the first object and the moving speed of the second object, based on a result of the grouping processing, by increasing the filter gains in proportion to a number of the plurality of reflection points; and
after applying the different filter gains, output the moving direction and the moving speed of each of the first object and the second object.

2. The object detection device according to claim 1, wherein the one or more processors are further configured to simultaneously calculate the moving direction and the moving speed in accordance with the following relational expression:

$$Vd\_i = V \times \cos(\theta\_i - \psi),$$

where a suffix i represents an index of the reflection point determined to be acquired from the same detection object, Vd_i represents a doppler speed at an i-th reflection point among the reflection points obtained through the grouping processing, θ_i represents an azimuth angle at the i-th reflection point among the reflection points obtained through the grouping processing, V represents a moving speed relative to the same object determined through the grouping processing, and w represents the moving direction of the same object determined through the grouping processing.

3. An object detection method, which is applied to a moving body, the object detection method comprising:

transmitting a radio wave to measure, based on a reflected wave acquired from an object to be detected existing in a periphery of the moving body, a position and a doppler speed of the object at a reflection point;

executing grouping processing of determining that a plurality of reflection points are acquired from a first object, and a single reflection point is acquired from a second object, among the plurality of objects;

calculating a moving direction and a moving speed of the first object by using the doppler speeds and the positions of the plurality of reflection points of the first object;

calculating a moving direction and a moving speed of the second object by using a difference in positions acquired in two consecutive cycles;

applying different filter gains to the moving speed of the first object and the moving speed of the second object, based on a result of the grouping processing, by increasing the filter gains in proportion to a number of the plurality of reflection points; and after applying the different filter gains, output the moving direction and the moving speed of each of the first object and the second object.

4. The object detection method according to claim 3, wherein the calculating of the moving direction and the moving speed of the first object are simultaneously performed in accordance with the following relational expression:

$$Vd\_i = V \times \cos(\theta\_i - \psi),$$

where a suffix i represents an index of the reflection point determined to be acquired from the same detection object, Vd_i represents the doppler speed at an i-th reflection point among the reflection points obtained through the grouping processing, θ_i represents an azimuth angle at the i-th reflection point among the reflection points obtained through the grouping processing, V represents a moving speed relative to the same object determined through the grouping processing, and w represents the moving direction of the same object determined through the grouping processing.

5. An object detection device, which is mounted to a moving body, the object detection device comprising one or more processors configured to obtain, from a plurality of object detection sensors, pieces of information on positions and doppler speeds of objects to be detected existing in a periphery of the moving body, wherein the one or more processors are further configured to determine whether determine that the obtained pieces of information comprise pieces of information regarding a plurality of reflection points obtained from a first object, and a piece of information regarding a single reflection point obtained from a second object, calculate a moving direction and a moving speed of the first object by using the doppler speeds and the positions of the plurality of reflection points of the first object;

calculate a moving direction and a moving speed of the second object by using a difference in positions acquired in two consecutive cycles;

apply correlation processing to the pieces of information obtained from the first object to associate the pieces of information with one another; and apply smoothing processing to the positions and the doppler speeds of the first object through application of different filter gains to the moving speed of the first object and the moving speed of the second object, based on a result of the correlation processing, by increasing the filter gains in proportion to a number of the plurality of reflection point, after applying the different filter gains, output the moving direction and the moving speed of each of the first object and the second object.

6. An object detection method, which is applied to a moving body, the object detection method comprising:

obtaining, from a plurality of object detection sensors, pieces of information on positions and doppler speeds of objects to be detected existing in a periphery of the moving body;

determining that the pieces of information comprise pieces of information regarding a plurality of reflection points obtained from a first object, and a piece of information regarding a single reflection point obtained from a second object;

calculating a moving direction and a moving speed of the first object by using the doppler speeds and the positions of the plurality of reflection points of the first object;

calculating a moving direction and a moving speed of the second object by using a difference in positions acquired in two consecutive cycles;

applying correlation processing to the pieces of information obtained from the first object to associate the pieces of information with one another; and applying smoothing processing to the positions and the doppler speeds of the first object through application of different filter gains to the moving speed of the first object and the moving speed of the second object, based on a result of the correlation processing, by increasing the filter gains in proportion to a number of the plurality of reflection point;

after applying the different filter gains, output the moving direction and the moving speed of each of the first object and the second object.

* * * * *